United States Patent
Chen et al.

(10) Patent No.: US 7,688,388 B2
(45) Date of Patent: Mar. 30, 2010

(54) IMAGE PROCESSING METHOD AND DEVICE THEREOF

(75) Inventors: Tsui-Chin Chen, Hsinchu (TW);
Dze-Chang Wang, Hsinchu (TW);
Hsiao-Ming Huang, Kaohsiung (TW);
Chang-Lun Chen, Hsinchu (TW);
Ho-lin Wang, Taoyuan County (TW);
Chui-Hsun Chiu, Taoyuan County (TW)

(73) Assignee: Novatek Microelectronics Corp., Hsinchu (TW)

( * ) Notice: Subject to any disclaimer, the term of this patent is extended or adjusted under 35 U.S.C. 154(b) by 1107 days.

(21) Appl. No.: 11/161,529

(22) Filed: Aug. 8, 2005

(65) Prior Publication Data

US 2006/0244823 A1    Nov. 2, 2006

(30) Foreign Application Priority Data

Apr. 27, 2005    (TW) ............... 94113398 A

(51) Int. Cl.
*H04N 5/14* (2006.01)
*H04N 5/253* (2006.01)

(52) U.S. Cl. ................ 348/701; 348/97; 348/452

(58) Field of Classification Search ............ 348/97, 348/700–701, 500, 441, 439, 450–453, 558, 348/456, 459, 607
See application file for complete search history.

(56) References Cited

U.S. PATENT DOCUMENTS

| | | | | |
|---|---|---|---|---|
| 5,398,071 A | * | 3/1995 | Gove et al. | 348/558 |
| 6,201,577 B1 | * | 3/2001 | Swartz | 348/558 |
| 7,170,562 B2 | * | 1/2007 | Yoo et al. | 348/452 |
| 7,239,353 B2 | * | 7/2007 | Lee et al. | 348/441 |
| 7,446,817 B2 | * | 11/2008 | Jung et al. | 348/468 |
| 2005/0253964 A1 | * | 11/2005 | Janssen et al. | 348/459 |

FOREIGN PATENT DOCUMENTS

| | | |
|---|---|---|
| KR | 1994-3201 | 2/1994 |
| KR | 2001-90466 | 10/2001 |

\* cited by examiner

*Primary Examiner*—Trang U Tran
(74) *Attorney, Agent, or Firm*—Jianq Chyun IP Office

(57) ABSTRACT

An image processing method and device thereof are provided. The device includes a capture device and a processor. The capture device is adopted for receiving a plurality of frames and comparing at least two adjacent frames to obtain an area selection signal according to a differential value therebetween. The processor is connected to the capture device for receiving the area selection signal and to separate each of the adjacent frames into at least two areas. Each of the areas of the adjacent frames is performed by an image processing step respectively, and then the images of the areas are combined to obtain a resulted frame.

20 Claims, 9 Drawing Sheets

IMAGE PROCESSING METHOD AND DEVICE THEREOF

CROSS-REFERENCE TO RELATED APPLICATION

This application claims the priority benefit of Taiwan application serial no. 94113398, filed on Apr. 27, 2005. All disclosure of the Taiwan application is incorporated herein by reference.

BACKGROUND OF THE INVENTION

1. Field of the Invention

This invention generally relates to an image processing method and device thereof, and especially to an image processing method and device thereof for processing images with running captions.

2. Description of Related Art

A conventional film mode, for example, a common record mode of a movie film, has 24 complete frames per second; therefore, the frame rate is 24 frame/s (or the frequency of the play is 24 Hz). Some other film mode records 30 complete frames per second, or the frequency of the play is 30 Hz. And the conventional broadcasting methods of visual signals, such as cable television and wireless television etc., generally comprise the broadcasting modes of NTSC (National Television System Committee) and PAL (Phase Alternative Line) etc. The broadcasting frequency of the NTSC is 60 Hz which means 60 interlaced frames per second are received at the end-user terminal from the television station. The broadcasting frequency of the PAL is 50 Hz. Wherein, the interlaced frames are, for example, in the odd-number frames, only the scan lines 1,3,5 . . . etc. (so called as the odd-number scan lines) display images. The even-number scan lines do not display any images. In the even-number frames, only the scan lines 2,4,6 . . . etc. (so called the even-number scan lines) display images; the odd-number scan lines do not have images; vice versa.

Therefore, for a film of 30 Hz or 24 Hz film mode, in order to transmit via the NTSC standard at 60 Hz, the processes of 2:2 pull down or 3:2 pull down should be performed before the transmission. FIG. 1 is a drawing schematically showing a view of a conventional frame converting format of a 30 Hz film mode with 2:2 pull down. As shown in FIG. 1, each frame 101,102 to 130 represents a complete image frame with 30 frames per second. Frame 101 is divided into an image frame 101$e$, which only even-number scan lines appear on the image, and a frame 101$o$, which only odd-number scan lines appears on the image. Other frames are processed with the same way. Therefore, 60 interlaced frames per second of 101$e$, 101$o$, 102$e$, 102$o$ to 130$e$ and 130$o$ etc. are achieved. Wherein, the frames with suffix "e" represent that only even-number scan lines appear on the images, and the frames with suffix "o" represent that only odd-number scan lines appear on the images (the following uses the same presentations). Thus, the NTSC standard at broadcasting frequency 60 Hz can be accorded.

FIG. 2 is a drawing schematically showing a view of conventional frame converting format of 24 Hz film mode with 3:2 pull down. As shown in FIG. 2, the frames 201, 202, 203 to 224 represent the complete image frames with 24 frames per second. Wherein, the first frame 201 is divided into the interlaced frames 201$e$ and 201$o$. Further, the second frame 202 is divided into frames 202$e$, 202$o$ and 202$e$ etc. Furthermore, the third frame 202 is divided into frames 203$e$ and 203$o$ etc. The other frames are processed with the same way. Thus, 60 frames per second of 201$e$, 201$o$, 202$e$, 202$o$ to 224$e$ and 224$o$ etc. are achieved, and the NTSC standard at broadcasting frequency 60 Hz can be accorded.

Besides, an original film at the film mode of 24 Hz, in order to transmit with the PAL standard at 50 Hz, the process of 2:2 pull down should be performed before the transmission. FIG. 3 is a drawing schematically showing a view of the conventional frame converting format of a 24 Hz film mode with 2:2 pull down. As shown in FIG. 3, the frames 301, 302 to 324 represent the complete image frames with 24 frames per second. The first frame 301 is divided into the interlaced frames 301$e$ and 301$o$. The other frames are processed with the same way. Therefore, frames 301$e$, 301$o$, 302$e$, 302$o$ to 324$e$ and 324$o$ etc. of 48 frames per second are achieved; and with other processes, the PAL standard at broadcasting frequency 50 Hz can be accorded.

Currently, a higher quality playback mode of an image playback device of an end-user terminal, for example, a High Definition TV (HDTV), in order to get better display definition, will first detect whether the received frames are the interlaced frames processed with 2:2 pull down or 3:2 pull down; further, by the Inverse Telecine (IVTC) process, the interlaced frames will be converted into complete frames before they are played back. For example, after receiving the interlaced frames 201$e$ to 224$o$ shown in FIG. 2, the frames 201$e$ and 201$o$ are combined to get the complete frame 201; the frames 202$e$ and 202$o$ are combined to get the complete frame 202; and other frames are processed with the same way. Accordingly, complete frames 201, 201 to 204 of 24 frames per second are achieved. FIG. 4 is a drawing schematically showing a view of a conventional playback mode of a film after the IVTC process performed with 3:2 pull down. Further, according to the mode of FIG. 4, the complete frame 201 as described is played two times to obtain the frames 201$p$ and 201$p$; the frame 202 is played three times to obtain the frames 202$p$, 202$p$ and 202$p$; and other frames are processed with the same way. Finally, 60 frames per second can be played with the playback mode as shown in FIG. 4. Comparing with the playback mode of a conventional TV which 60 interlaced frames per second are played, the frames played with the playback mode as shown in FIG. 4 are smooth without the effects of drop frame, image displacement or image delay.

However, in the conventional broadcasting mode of the visual signal, running captions are frequently added. In general, the running captions are added directly to the interlaced broadcasting frames, for example, added directly to the interlaced frames 101$e$, 101$o$, 102$e$, 102$o$ to 130$e$ and 130$o$ as shown in FIG. 1, or added directly to the interlaced frames as shown in FIG. 2 or FIG. 3. Next, the interlaced frames with the added running captions are transmitted to the end-user terminal.

FIG. 5 is a drawing schematically showing a view of a conventional frame process mode with an interlace mode after adding running captions. As shown in FIG. 5, when the interlaced frames received by an image playback device of an end-user terminal are, for example, the interlaced frames 201$e$ to 224$o$ as shown in FIG. 2 with addition of the running captions 501$e$, 501$o$ to 530$e$ and 530$o$, the conventional image playback device will combine the interlaced frames 201$e$ and 201$o$ to a complete frame 551, and combine the interlaced frames 201$o$ and 202$e$ to a complete frame 552, and the other frames are processed with the same way. Accordingly, 60 frames per second frames 551 to 580 can be achieved. It can be noted that the display quality of the running captions achieved by the mode is excellent. However, the definition of the whole frame is deteriorated. For example, the complete frame 552 is composed of the interlaced frames 201o and 202e which are belonged to two different complete frames 201 and 202 as shown in FIG. 2. Consequently, many images with ragged saw tooth are occurred at the intersections of the images in the frame 552. Therefore, a more suitable process method and device for processing the frames with added running captions is imminent and necessary.

SUMMARY OF THE INVENTION

An object of the present invention is to provide an image processing method, for separating the received frame to at least two different areas, further respectively performing different image processes to the different areas, to obtain a better resulted frame.

Another object of the present invention is to provide an image processing device, for separating the received frame to at least two different areas, further separately performing different image processes to the different areas, to obtain a better resulted frame.

The present invention provides an image processing method, which comprises the following steps. First, a plurality of frames is received. Further, at least two adjacent frames are compared to obtain an area selection signal. Further, each of the frames is separated to at least two areas according the area selection signal. Next, an image process is performed respectively to each of the areas. Finally, the corresponding processed areas are combined to obtain a resulted frame.

According to an embodiment, the present invention provides an image processing device comprising, for example, a capture device and a processor. The capture device is adopted for receiving a plurality of frames, and for comparing at least two adjacent frames to obtain an area selection signal according to a differential value there-between. The processor is connected to the capture device for receiving the area selection signal and to separate each of the adjacent frames into at least two areas according to the area selection signal. Each of the areas is performed by an image processing step respectively. Moreover, the corresponding processed areas are combined to obtain a resulted frame.

In accordance with an embodiment of the present invention, the image processing step comprises that, for example, according to the area selection signal, an inverse telecine (IVTC) process mode is performed to the area, when one of the areas is created by a pull down mode. Further, the inverse telecine process mode comprises, for example, performing an inverse process mode of the pull down mode. Further, one of the areas obtained by the pull down mode comprises a frame which is created from a frame of film mode by the pull down mode. Further, the pull down mode comprises 2:2 pull down mode, 3:2 pull down mode or other pull down modes with any proportion.

In accordance with an embodiment of the present invention, the method of respectively performing the image processing steps to each of the areas comprises that, for example, according to the area selection signal, a motion adaptive process mode is performed to the area when one of the areas is created by an interlace mode. Further, the motion adaptive process mode comprises combining each two of the adjacent frames to obtain a complete frame. Further, one of the areas, which is created by the interlace mode, comprises a running caption.

In accordance with an embodiment of the present invention, a method of comparing at least two adjacent frames comprises: each corresponding vertical line of the two adjacent frames is scanned; further, the changes of the image positions of the corresponding vertical lines in the two adjacent frames are compared to obtain an area selection signal.

In accordance with another embodiment of the present invention, a method of comparing at least two frames of the adjacent frames comprises: each corresponding specific area block of the two frames of the adjacent frames is scanned; further, the changes of the corresponding image positions of the corresponding specific area blocks are compared to obtain an area selection signal.

In accordance with another embodiment of the present invention, a method of obtaining the area selection signal comprises: after comparing at least the two frames of the adjacent frames, the area selection signal is decided according to a differential value of the frames.

The above is a brief description of some deficiencies in the prior art and advantages of the present invention. Other features, advantages and embodiments of the invention will be apparent to those skilled in the art from the following description, accompanying drawings and appended claims.

DESCRIPTION OF THE PREFERRED EMBODIMENTS

Figure 6:
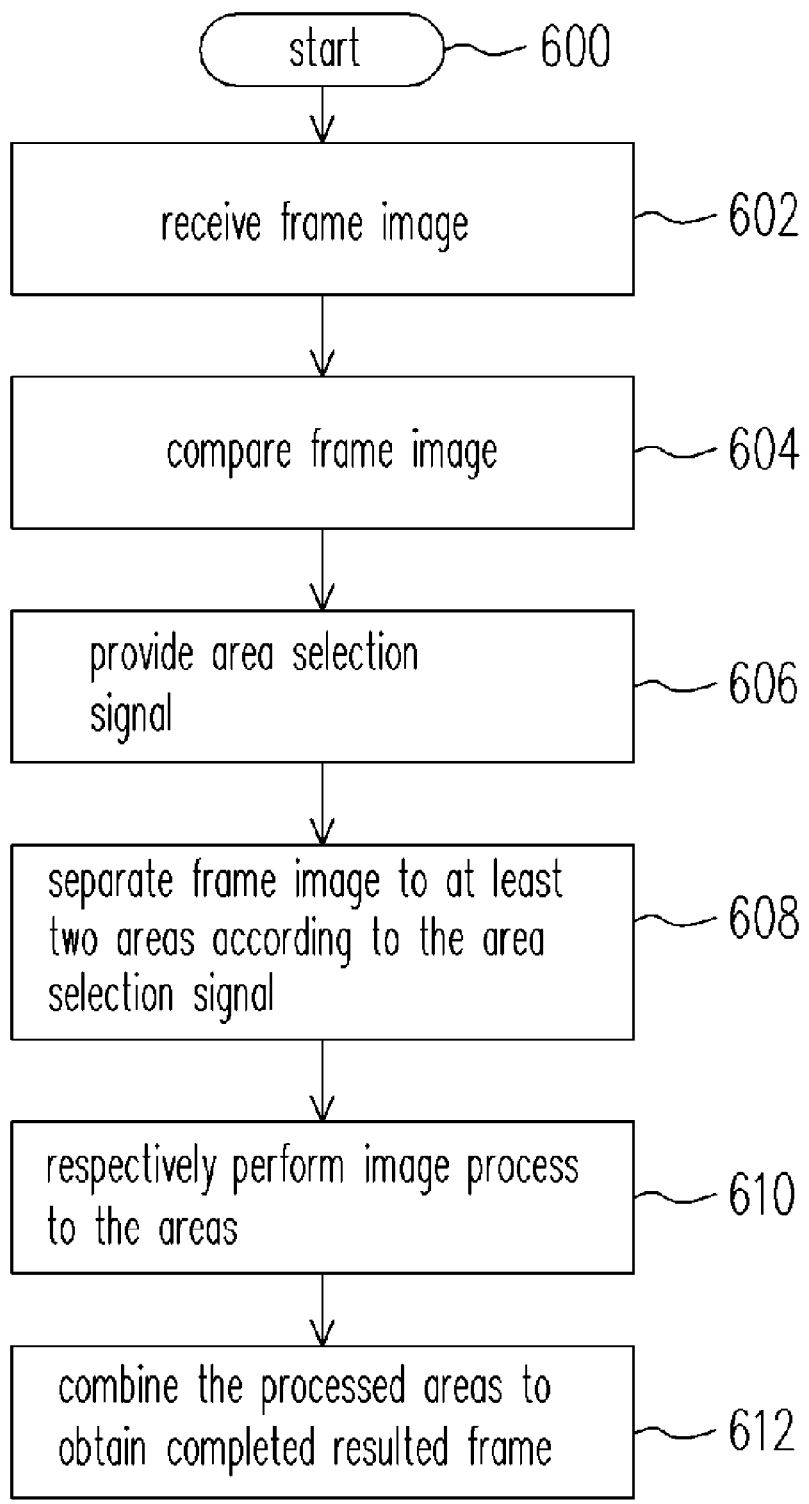
FIG. 6 is a drawing schematically showing a flow chart of an image processing method according to an embodiment of the present invention.
Figure 7:
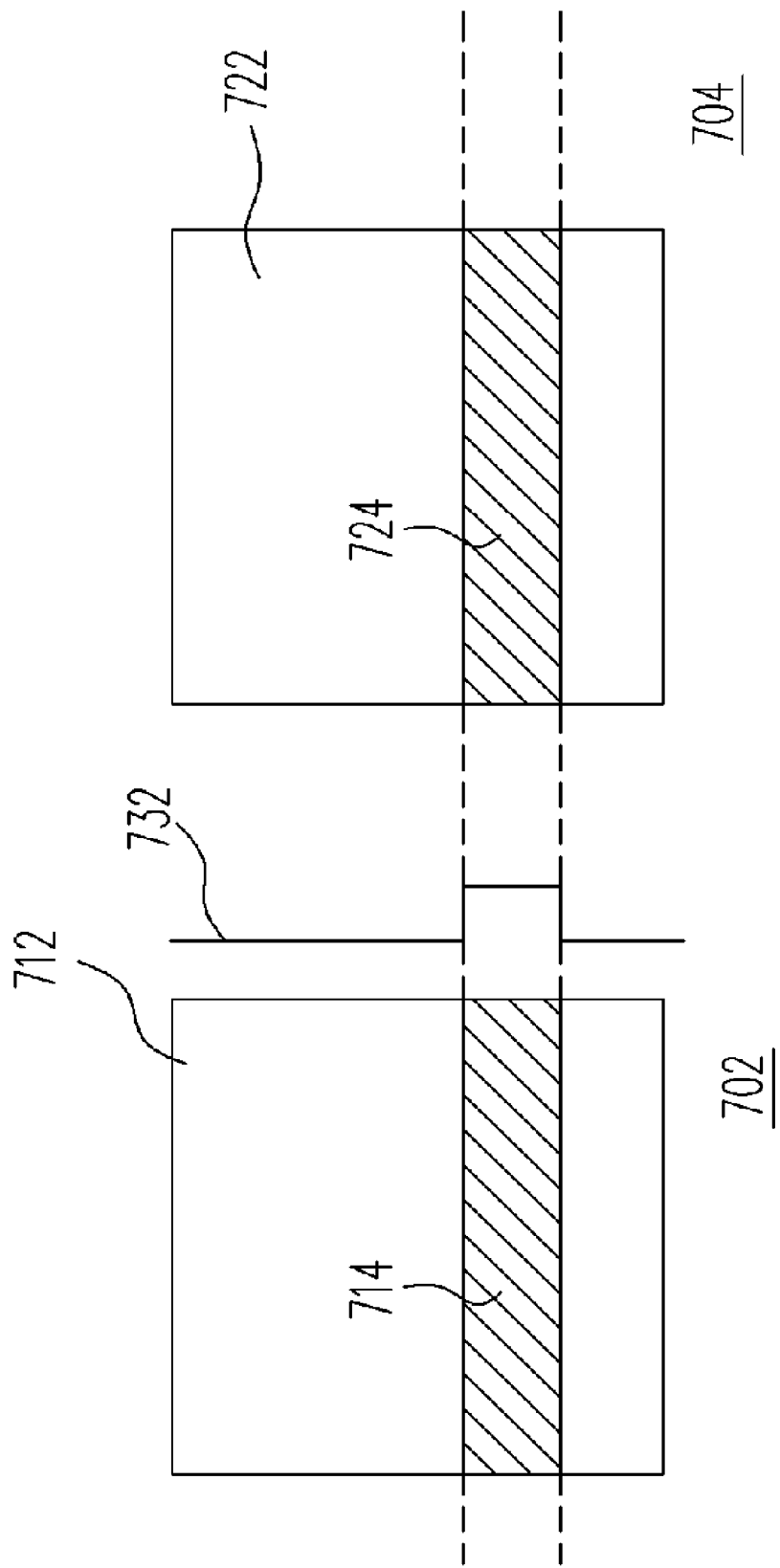
FIG. 7 is a drawing schematically showing a view of a detecting frame mode according to an embodiment of the present invention.

FIG. 6 is a drawing schematically showing a flow chart of an image processing method according to an embodiment of the present invention. FIG. 7 is a drawing schematically showing a view of a detecting frame mode according to an embodiment of the present invention. As shown in FIG. 6, first a plurality of (?) frames is received (step 602). Next, two or more adjacent frames are compared (step 604). As shown in FIG. 7, for example, when an image area 712 and an added running caption area 714 exist in the received frame 702, an area selection signal 732 can be obtained from the comparing result (step 606) to indicate the position of the running caption area 714. Further, in step 608, according to the area selection signal 732, the received frame 702 is divided into two areas, for example, an image area 722 and a running caption area 724.

In accordance with an embodiment of the present invention, the method of comparing two or more frames of the adjacent frames comprises, for example, a scanning method. The scanning method, for example, includes horizontal scanning, vertical scanning or area block scanning etc. In an embodiment of the present invention, the vertical scanning method comprises: first, each corresponding vertical line of at least two frames of the adjacent frames is scanned; a subtraction is performed between each corresponding pixel of the corresponding vertical lines; the differential values obtained from the subtraction of each pixel in each vertical line are accumulated; the differential value of the accumulated value of each vertical line is compared.

In accordance with another embodiment of the present invention, the horizontal scanning method comprises: first, each corresponding horizontal line of at least two frames of the adjacent frames is scanned; a subtraction is performed between each corresponding pixel in the corresponding horizontal lines; the differential values obtained from the subtraction of the each pixel in each vertical line are accumulated; the differential value of the accumulated value of each horizontal line is compared.

In accordance with another embodiment of the present invention, the area block scanning method comprises: first, each corresponding specific area block of at least two frames of the adjacent frames is scanned; a subtraction is performed between each corresponding pixel in the corresponding specific area blocks; the differential values obtained from the subtraction of each pixel in each specific area block are accumulated; the differential value of the accumulated value of each specific area block is compared.

When the differential value obtained from any of the above mentioned scanning methods is beyond a predetermined value, for example, an area selection signal 732 can be obtained as shown in FIG. 7. Therefore, the frame can be separated to two areas according to the area selection signal 732. Further, in step 610, different image processes can be performed to different areas. Furthermore, in step 612, the processed areas are combined to obtain a complete resulted frame.

Figure 2:
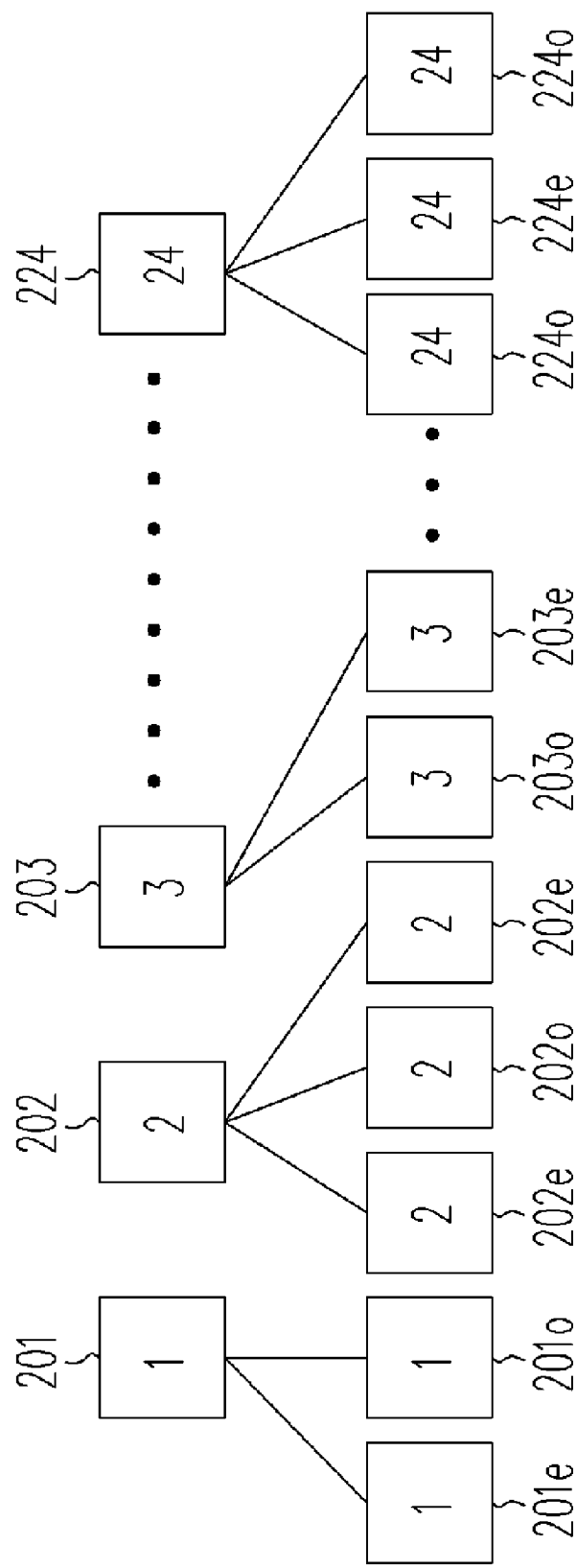
FIG. 2 is a drawing schematically showing a view of a conventional frame converting format of 24 Hz film mode with 3:2 pull down.
Figure 8:
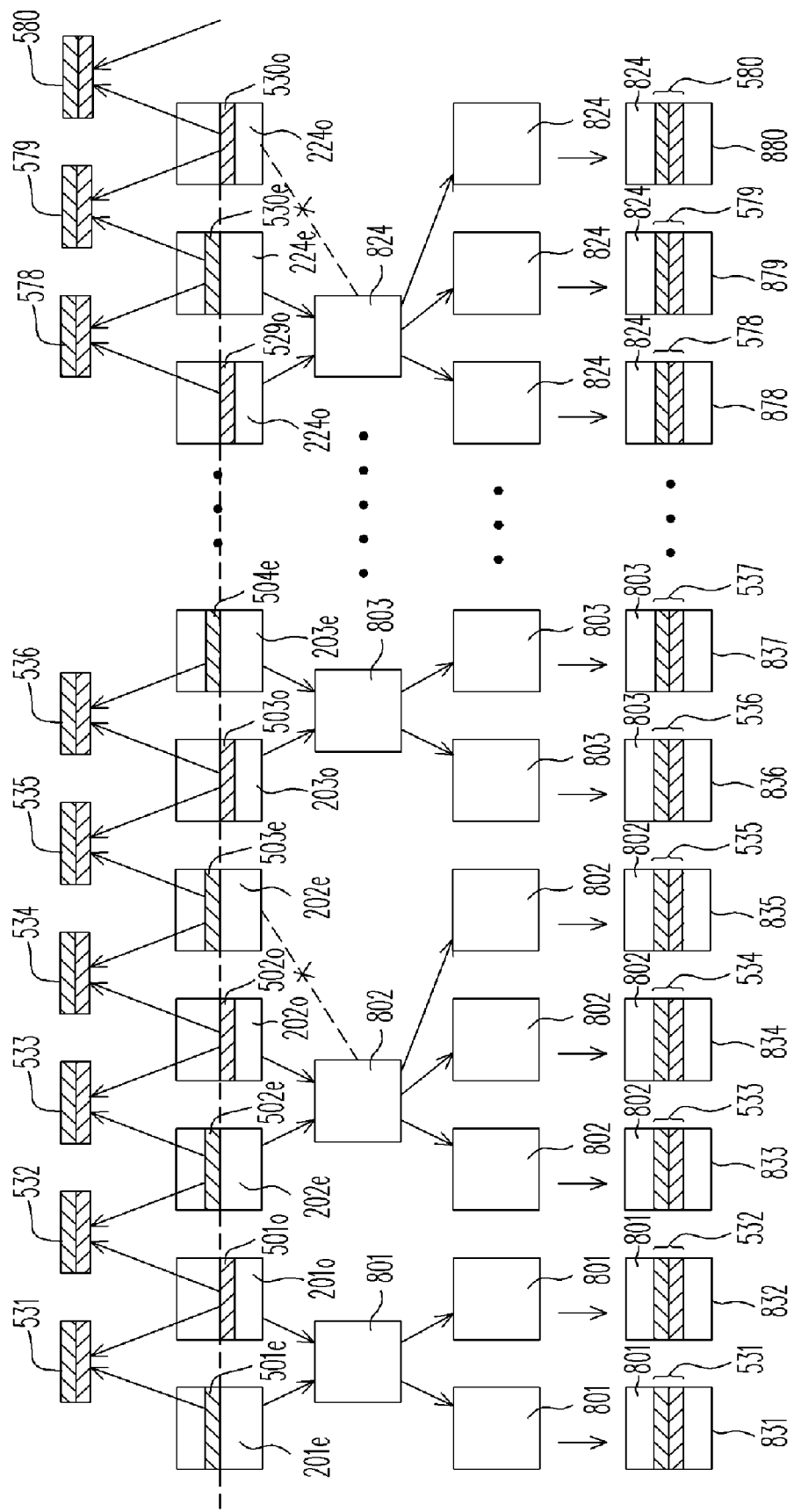
FIG. 8 is a drawing schematically showing a view of a frame processing mode according to an embodiment of the present invention.

FIG. 8 is a drawing schematically showing a view of a frame processing method according to an embodiment of the present invention. As shown in FIG. 8, for example, the frames received in the present invention are the interlaced frames, 201e to 224o, as shown in FIG. 2 with the running captions 501e and 501o to 530e and 530o. By the image process method as shown in FIG. 6, the area selection signal 732 is obtained as shown in FIG. 7, for which the frame area and the running caption area are separated. Further, a motion adaptive mode will be applied to the running caption area; for example, the running captions 501e and 501o are combined to a running caption 531, the running captions 501o and 502e are combined to a running caption 532, and so on. Ultimately, high definition running captions 531 to 580 of 60 frames per second can be obtained.

Further, as shown in FIG. 8, for the image area, the present invention detects that the interlaced frames 201e to 224o are formed by 3:2 pull down mode. An inverse telecine (IVTC) mode can be utilized to combine the frames 201e and 201o to a complete frame 801; the frames 202e and 202o are combined to a complete frame 802; and other frames are processed with the same way. Thus, complete frames 801, 802 to 824 of 24 frames per second can be obtained. Next, in accordance with 3:2 pull down mode, the obtained complete frame 801 is repeated two times, the frame 802 is repeated three times, and other frames are processed with the same way. Further, the image frames 801, 801, 802, 802, 802 to 824, 824, 824 and the running captioned frames 531 to 580 are combined to obtain complete frames 831 to 880 of 60 frames per second.

Therefore, the image processing method of the present invention not only maintains high definition of film mode in the original frame, but also obtains clearly and easily distinguishable running captions. In addition, the effects of the saw-tooth phenomenon occurred in each frame or at the intersection areas between the running captions and the frames can be avoided.

It is important to note that although the illustrated embodiment herein refers to the explanation of the present invention, it is to be understood that the embodiment is presented by way of example and not by way of limitation. In other embodiments of the present invention, for example, the frame is not necessarily separated to two areas. In contrast, according to the resource mode, the received frame can be separated to at least two different areas, for example, to at least the image areas formed by the pull down mode and the running caption area formed by the interlace mode; further, the different image processes are respectively performed to the areas formed by different modes.

Further, in accordance with another embodiment of the present invention, for example, when all the received images are formed with one same mode as show in FIG. 2 which are formed with 3:2 pull down mode without the running caption area, the area selection signal 732 as shown in FIG. 7 will not be obtained by the image processing method of the present invention. Therefore, in FIG. 8, the processing mode for the running area will not be performed; only the inverse telecine process will be performed to the image area. Further, the complete frame is played by the corresponding pull down mode.

Figure 1:
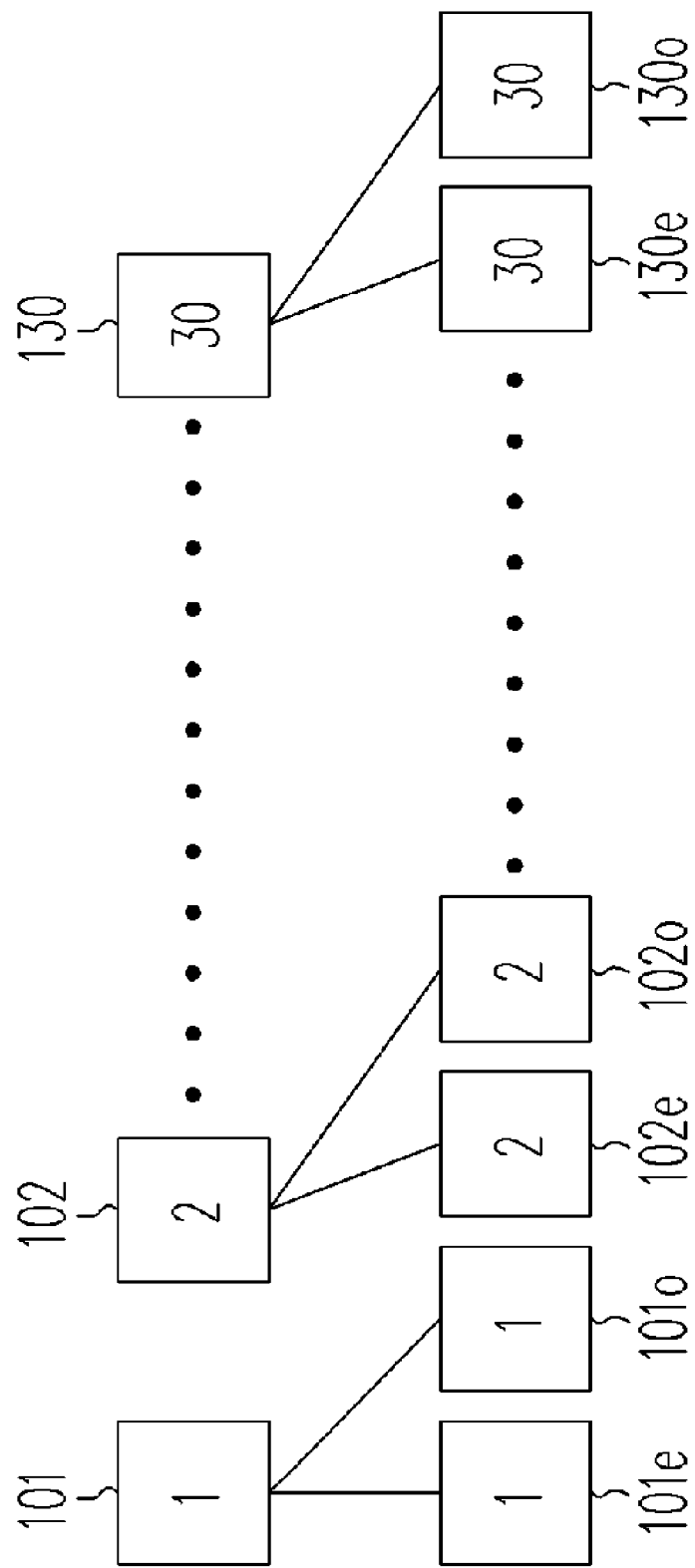
FIG. 1 is a drawing schematically showing a view of a conventional frame converting format of 30 Hz film mode with 2:2 pull down.
Figure 3:
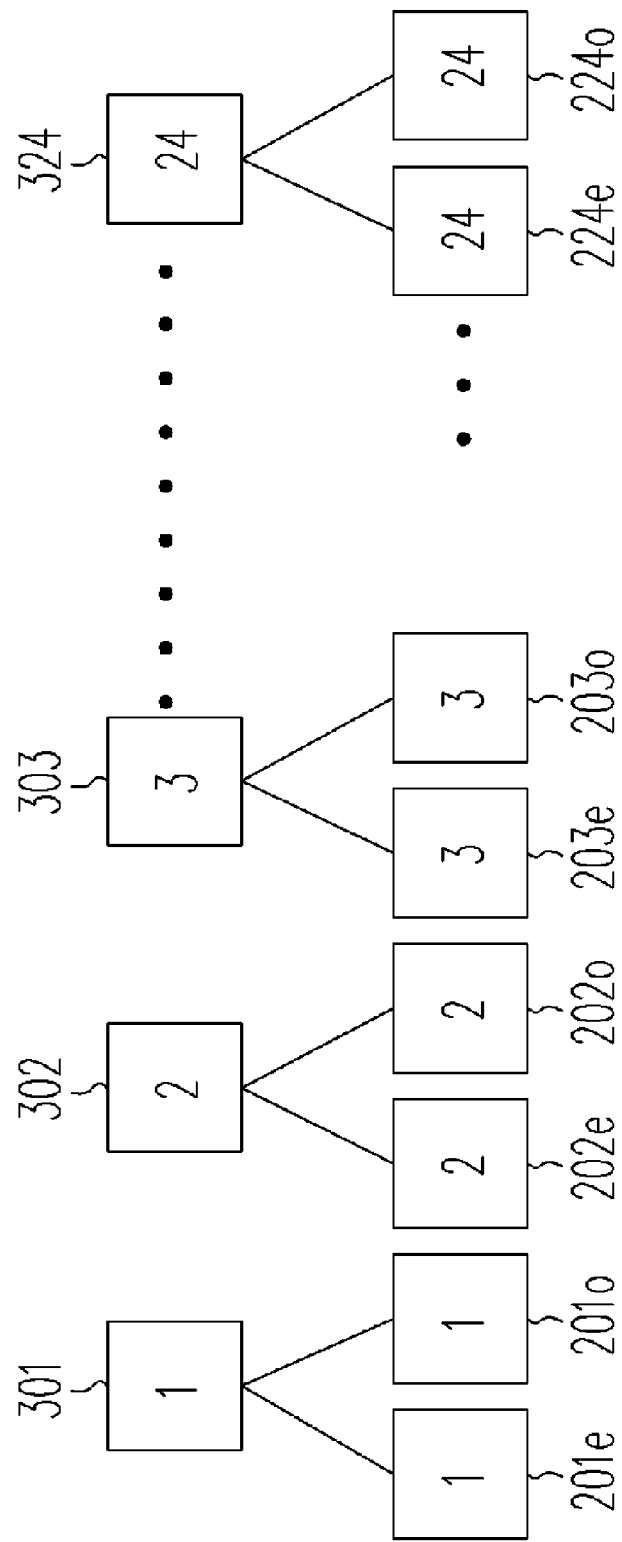
FIG. 3 is a drawing schematically showing a view of a conventional frame converting format of 24 Hz film mode with 2:2 pull down.
Figure 4:
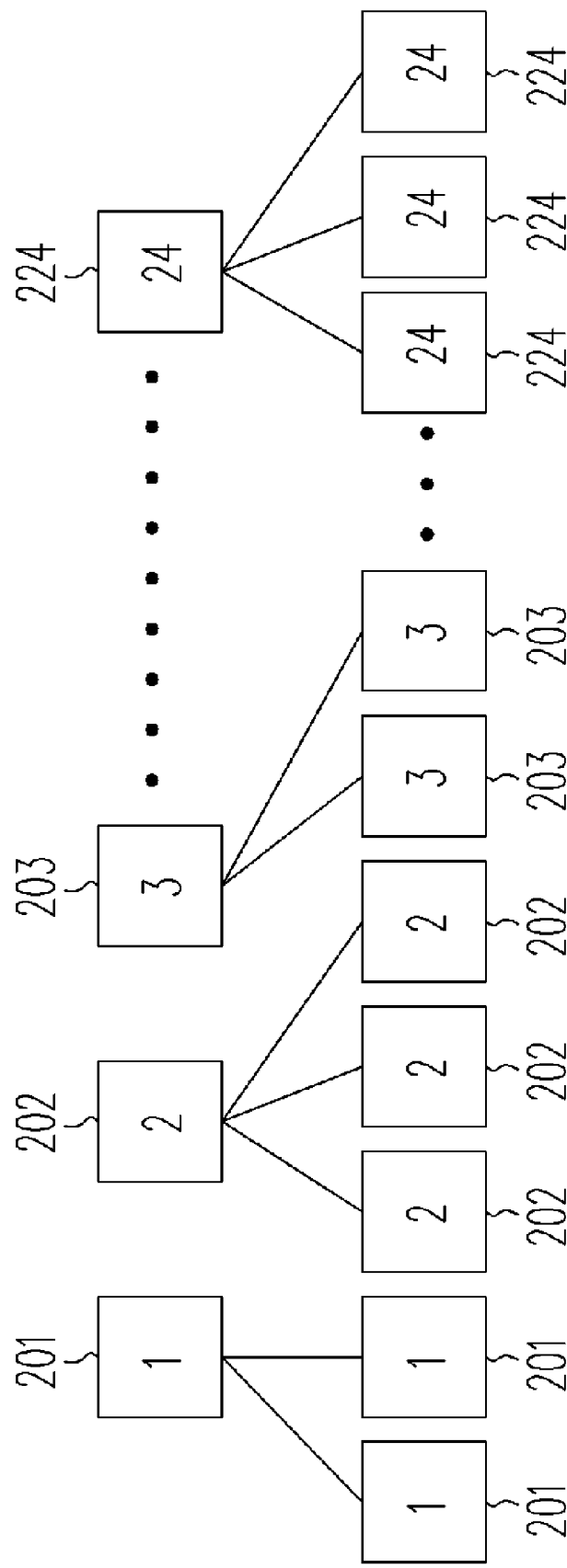
FIG. 4 is a drawing schematically showing a view of a conventional playback mode an IVTC process performed with 3:2 pull down.
Figure 5:
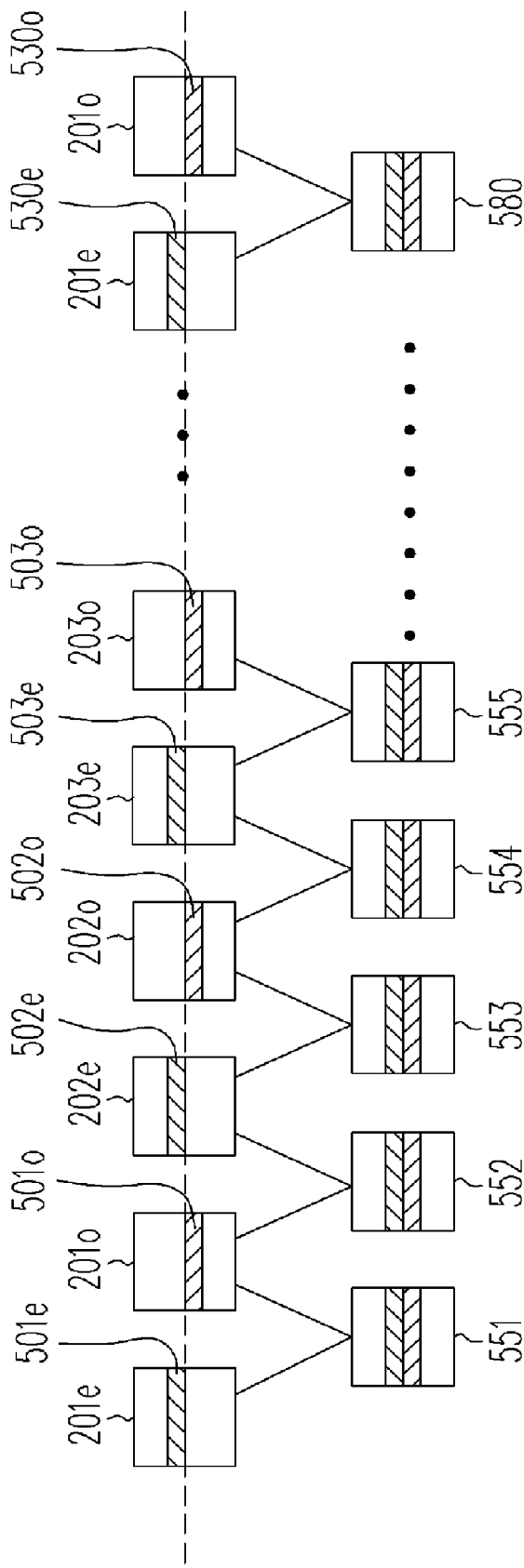
FIG. 5 is a drawing schematically showing a view of a conventional frame process mode with interlace mode after adding running captions.

Further, in accordance with another embodiment of the present invention, for example, when the received images are formed with other modes, for example, as show in FIG. 1 or FIG. 3 or other modes, and added with the running caption, the area selection signal 732 as shown in FIG. 7 will be obtained first by the image processing method of the present invention. Further, with the similar manner as shown in FIG. 8, a step-by-step process is performed to the running caption area, and the inverse telecine process mode and the corresponding pull down mode are performed to the image area. Furthermore, the image area and the running caption area are combined to obtain a relatively high definition frame.

Figure 9:
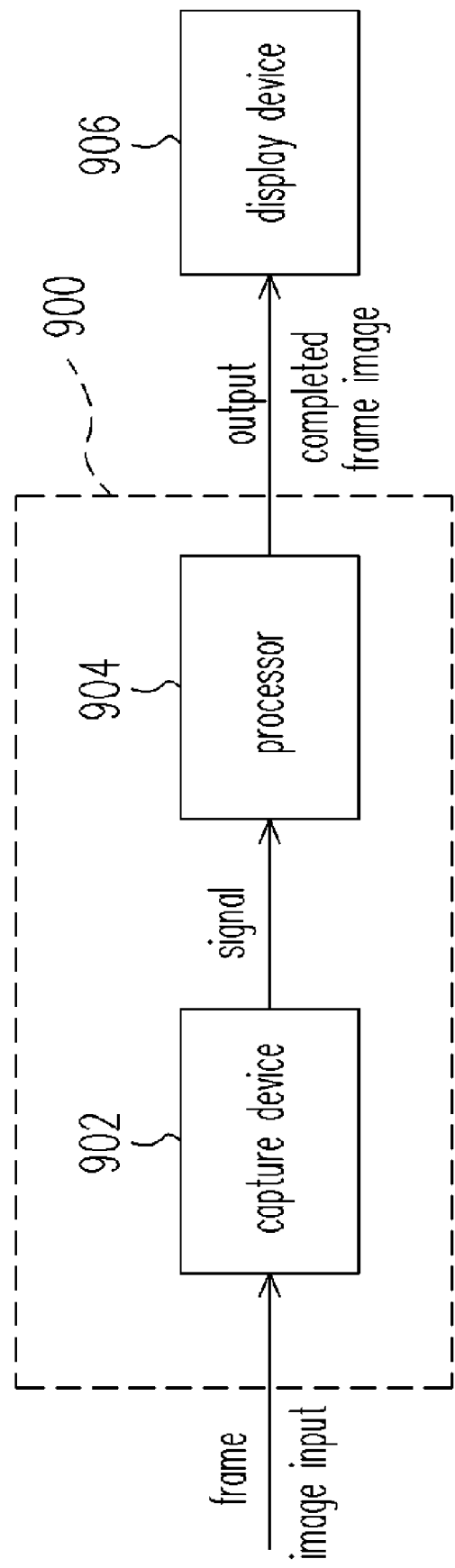
FIG. 9 is a drawing schematically showing a view of an image processing device according to an embodiment of the present invention.

Further, the present invention provides an image processing device. FIG. 9 is a drawing schematically showing a view of an image processing device according to an embodiment of the present invention. As shown in FIG. 9, the image processing device 900 comprises, for example, a capture device 902 and a processor 904. Wherein, the capture device 902 is utilized to receive a plurality of frames, to compare at least two adjacent frames and to output an area selection signal which indicates frame difference. The processor 904 connected to the capture device 902 receives the area selection signal outputted from the capture device 902, separates the received frame to at least two different areas according to the area selection signal, respectively performs different image process modes to the frame of each area. Further, the frames of all the processed areas are combined to obtain a resulted frame and to output the resulted frame to the display device 906.

In summary, in the image processing method and device of the present invention, an area selection signal is obtained according to the received frame; the frame is separated to at least two different areas according to the source mode of the received frame, which the source mode is detected according to the area selection signal; further, the different image processes are respectively performed to the different areas. Therefore, the image processing method in the present invention maintains higher definition of film mode in the original frame, obtains clearly and easily distinguishable running captions. In addition, the saw-tooth phenomenon occurred in each frame or at the intersection areas between the running captions and the frames is avoided.

The above description provides a full and complete description of the preferred embodiments of the present invention. Various modifications, alternate construction, and equivalent may be made by those skilled in the art without changing the scope or spirit of the invention. Accordingly, the above description and illustrations should not be construed as limiting the scope of the invention which is defined by the following claims.

What is claimed is:

1. An image processing method adapted to an image processing device, the image processing method comprising:
    receiving a plurality of frames;
    comparing at least two adjacent frames to obtain an area selection signal;
    separating each of the frames to at least two areas according the area selection signal, wherein the area selection signal is used for indicating a position of one of the two areas;
    respectively performing an image process step to each of the areas; and
    combining the corresponding processed areas to obtain a resulted frame.

2. The image processing method of claim 1, wherein the method of respectively performing the image process step to each of the areas comprises:
    according to the area selection signal, an inverse telecine (IVTC) process mode is performed to the area when one of the areas is created by a pull down mode.

3. The image processing method of claim 2, wherein the inverse telecine process mode comprises performing an inverse process mode of the pull down mode.

4. The image processing method of claim 2, wherein one of the areas created by the pull down mode comprises a frame which is created from a frame of film mode by the pull down mode.

5. The image processing method of claim 2, wherein the pull down mode comprises 2:2 pull down mode, 3:2 pull down mode or pull down modes with any proportion.

6. The image processing method of claim 1, wherein the method of respectively performing the image process step to each of the areas comprises:
    according to the area selection signal, a motion adaptive process mode is performed to the area when one of the areas is created by an interlace mode.

7. The image processing method of claim 1, wherein the progressive process mode comprises combining each of the two adjacent frames to obtain a complete frame.

8. The image processing method of claim 1, wherein one of the areas created by the interlace mode comprises a running caption.

9. The image processing method of claim 1, wherein a method of comparing at least two frames of the adjacent frames comprises:
    scanning each corresponding vertical line of at least the two frames of the adjacent frames;
    subtracting each corresponding pixels in at least two of the corresponding vertical lines; and
    detecting distribution situation of saw-tooth images.

10. The image processing method of claim 1, wherein a method of comparing at least two frames of the adjacent frames comprises:
    scanning each corresponding horizontal line of at least the two frames of the adjacent frames;
    comparing change of image position of the corresponding horizontal line in at least the two adjacent frames; and
    detecting distribution situation of saw-tooth image.

11. The image processing method of claim 1, wherein a method of comparing at least the two adjacent frames comprises:
    scanning each corresponding specific area block of at least the two frames of the adjacent frames;
    subtracting each corresponding pixel in at least two of the corresponding specific area blocks; and
    recording distribution situation of saw-tooth image in each of the specific area blocks.

12. The image processing method of claim 1, wherein a method of obtaining the area selection signal comprises:
    after comparing at least the two frames of the adjacent frames, deciding the area selection signal according to the distribution situation of saw tooth image.

13. An image processing device, comprising:
    a capture device, for receiving a plurality of frames, comparing at least two adjacent frames to obtain an area selection signal according to the distribution situation of saw tooth image; and
    a processor, connecting to the capture device, for receiving the area selection signal, separating each of the frames of at least the two adjacent frames to at least two areas according to the area selection signal which is used for indicating a position of one of the two areas, respectively performing an image process step to each of the areas, and combining the areas correspondingly processed to obtain a resulted frame.

14. The image processing device of claim 13, wherein the image process step comprises:
    according to the area selection signal, a inverse telecine (IVTC) process mode is performed to the area when one of the areas is created by a pull down mode.

15. The image processing device of claim 14, wherein the inverse telecine process mode comprises performing an inverse process mode of the pull down mode.

16. The image processing device of claim 14, wherein one of the areas created by the pull down mode comprises a frame which is created from a frame of film mode by the pull down mode.

17. The image processing device of claim 14, wherein the pull down mode comprises 2:2 pull down mode, 3:2 pull down mode or pull down modes with any proportion.

18. The image processing device of claim 13, wherein the method of respectively performing the image process step to each of the areas comprises:
    according to the area selection signal, a motion adaptive process mode is performed to the area when one of the areas is created by an interlace mode.

19. The image processing device of claim 18, wherein the motion adaptive process mode comprises combining each two of the adjacent frames to obtain a complete frame according to the pixel value difference of each corresponding pixel.

20. The image processing device of claim 18, wherein one of the areas created by the interlace mode comprises a running caption.

* * * * *